United States Patent
Foti

(10) Patent No.: US 8,196,163 B2
(45) Date of Patent: Jun. 5, 2012

(54) CONTROLLED DELIVERY OF EVENT INFORMATION TO IPTV USERS

(75) Inventor: George Foti, Dollard-des-Ormeaux (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 950 days.

(21) Appl. No.: 12/201,169

(22) Filed: Aug. 29, 2008

(65) Prior Publication Data

US 2009/0293113 A1 Nov. 26, 2009

Related U.S. Application Data

(60) Provisional application No. 61/054,874, filed on May 21, 2008.

(51) Int. Cl.
- H04N 7/10 (2006.01)
- H04N 7/025 (2006.01)
- H04N 7/173 (2011.01)
- G06F 15/173 (2006.01)
- G06F 15/16 (2006.01)

(52) U.S. Cl. ............... 725/32; 725/34; 725/58; 725/109; 709/224; 709/227

(58) Field of Classification Search ................. 725/9, 14, 725/32, 34, 58, 74, 105, 135; 709/224, 227–229
See application file for complete search history.

(56) References Cited

U.S. PATENT DOCUMENTS

| | | |
|---|---|---|
| 2002/0026483 A1 | 2/2002 | Isaacs et al. |
| 2003/0108000 A1 | 6/2003 | Chaney et al. |
| 2007/0165623 A1 | 7/2007 | Clark et al. |
| 2008/0112405 A1 | 5/2008 | Cholas et al. |
| 2008/0127255 A1 * | 5/2008 | Ress et al. ........................ 725/38 |

FOREIGN PATENT DOCUMENTS

| WO | 2007131548 A1 | 11/2007 |
|---|---|---|
| WO | WO 2008016320 A1 * | 2/2008 |
| WO | WO 2008077436 A1 * | 7/2008 |

OTHER PUBLICATIONS

Dirk Trossen, Dana Pavel—"Service Discovery & Availability Subscriptions Using the SIP Event Framework"—0-7803-8938-7/05-2005 IEEE.*

Andreas Haber, Martin Gerdes, FRank Reichert, and Ram Kumar—"Remote Service Usage through SIP with Multimedia Access as an Use Case"—Mar. 15, 2007.*

PCT Search Report from corresponding application PCT/IB2009/051794.

Yuping Yang et al., Handling Personalized Redirection in a Wireless Pervasive Computing System with Different Approaches to Identity, IEEE 2006.

* cited by examiner

*Primary Examiner* — Hai V Tran
(74) *Attorney, Agent, or Firm* — Dilip C. Andrade; Ericsson Canada Inc.

(57) ABSTRACT

A method and a gateway are provided for controlling delivery of event information to users sharing a user device. The gateway is informed of activity states of each user sharing a same user device. Events related to services used by the users are detected by the gateway. Because some users of a same device may be active while others are inactive, the gateway verifies the activity state of each user for whom an event is detected. Active users are informed of events that are of interest for them.

13 Claims, 4 Drawing Sheets

CONTROLLED DELIVERY OF EVENT INFORMATION TO IPTV USERS

PRIORITY STATEMENT UNDER 35 U.S.C. S.119(e) & 37 C.F.R. S.1.78

This non-provisional patent application claims priority based upon the prior U.S. provisional patent application entitled "Publication of Activity Status for IMS IPTV Users", application No. 61/054,874, filed May 21, 2008, in the name of George Foti.

TECHNICAL FIELD

The present invention relates generally to the field of communications and, more specifically, to a method and a gateway for controlling the delivery of event information to IPTV users.

BACKGROUND

Television service has recently started being delivered to end-users over the Internet Protocol (IP) network. IP television (IPTV) is oftentimes delivered by use of an IP multimedia service (IMS) network. Some of the many advantages of IPTV over traditional broadcast television comprise the possibility to offer video on demand (VOD), using picture-in-picture to peek into a second channel while watching a program on a first channel, pausing, rewinding and restarting a program, and the like.

In the IMS architecture, there is an IMS gateway linking various IP-enabled devices in a household to the external IMS network. The gateway essentially acts as a user agent (UA) for interfacing between service providers in the IMS network and end-user devices. A variety of services can be provided to users logged onto the IMS network, through the IMS gateway. The nature of IPTV IMS services is such that end-users must log in or register to the IMS network, though the gateway, before getting access to services. The gateway is able to relate signaling between the IMS network and the devices connected thereto by keeping identities of those devices in memory.

In a household, a same IPTV terminal function (ITF), also called set-top box (STB), may be shared by more than one user. For example, a first user may be recording a movie on a digital recorder while a second user may be watching a television program on a TV set. As a result, two or more users of a same ITF may be logged in or registered at the same time. However, while one user may be actively watching a television program, another user might be "inactive" in the sense that, whether or not the TV is powered on, the person is not currently watching the movie, which is intended to been seen later on.

IPTV and IMS networks are such that there can be multiple applications running in the background. Consequently, all events associated with users that are not actively present, but registered in the network, may end up being presented to other active users of a same household, leading to much confusion.

As an example of a problem found in the prior art, user A in a household has first logged in and programmed a network personal video recording to start two hours later. User A has logged out and is thus not currently active. User B in the same household logs in to watch a television program and is now an active user. Two hours later, the network personal video recording application starts executing in the background. That application registers the user A to the IMS network, on his behalf, so it can start the recording. This step of registering the inactive user A is essential for compliance to the IMS network.

While the user A is not active, in the sense that he is not at that time watching a television screen, he is however registered as far as the IMS network is concerned. Once the user A is registered, he can receive any network event intended for him, even though the user A is indeed not actively watching the television screen. Such network events, because they are received on the ITF shared by both users A and B, are displayed on the television screen currently being watched by user B. One possible example of network event, wrongly displayed on the television screen of user B, may be a tariff indication for recording the movie requested by the user A. This may be confusing for the user B. Moreover, if a network event requires an acknowledgement from the user A, the user B may refrain from providing the acknowledgement, which may cause the network to repeat the network event, thereby causing useless traffic leading to congestion in the network. Alternatively, the user B might provide an acknowledgement that is not what the user A might have desired, for example refusing the indicated tariff and thereby cancelling the recording.

Currently it is not possible, without adding significant complexity in the ITF, to hide undesirable effects resulting from messages intended for inactive users that arrive to the ITF while other users are active.

SUMMARY

There would be clear advantages of having a method and a gateway for avoiding disturbing active users of a device with messages, signals or events that are actually intended for other users of the same device, those other users currently being inactive.

It is therefore a broad object of this invention to provide a method and a gateway for controlling delivery of event information to users. The invention is of particular interest where two or more users, for example two members of a same household, both have access to a same device, each user having their own user identities.

A first aspect of the present invention is directed a method of controlling delivery of event information to users. The method comprises a first step of receiving at a gateway, from a user device, a device identity, an activity state and a corresponding user identity. The gateway stores a binding comprising the device identity, the activity state along with the corresponding user identity. The gateway later detects an event related to the user identity. The gateway considers the activity state for the user identity. If the activity state indicates activity, the gateway sends to the user device information about the event along with the corresponding user identity.

A second aspect of the present invention is directed to a variant of the hereinabove method. The event is embodied by a signal received at the gateway. If the activity state indicates inactivity, the gateway replies to an originator of the signal. In some embodiments, the method further comprises, if the activity state indicated inactivity, the gateway silently discarding information about the event.

A third aspect of the present invention is directed to a further variant of the hereinabove method. The gateway stores two or more bindings for the user device, each of the two or more bindings comprising the device identity, a distinct activity state and a distinct user identity. A first one of the two or more bindings comprises an active indication and a second one of the two or more bindings comprises an inactive indication. The gateway determines that the event is related to one of the distinct user identities comprised in one of the first and second bindings. Based on the user identity related to the event, the gateway determines whether or not to send towards the user device information about the event.

A fourth aspect of the present invention is directed to a gateway for controlling delivery of event information to users. The gateway comprises a memory that stores bindings of device identities with activity states and corresponding user identities. The gateway also comprises an input-output device that receives a device identity, an activity state and a user identity, and that sends event information. The gateway further comprises a processor. The processor receives from the input-output device the device identity, the activity state and the user identity. The processor stores these three information elements in a binding within the memory. When the processor detects an event related to the user identity, it reads from the memory the activity state, and, conditional to the activity state indicating active, it then requests the input-output device to send, addressed to the device identity, the user identity and information about the event.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and a gateway for controlling whether or not users of services are informed of events that relate to their subscription. The invention is of particular interest when two or more users of a same device are concurrently logged onto a service provider network. The invention may be used in support of end-user services, for example Internet Protocol Television (IPTV). The invention comprises an interaction between a user device, for example an IPTV terminal function (ITF), sometimes also called television set-top box (STB), and a gateway (GW), for example an IP Multimedia System (IMS) IPTV GW. The ITF signals to the GW, by use of new signaling options, indicating whether a user having a particular user identity (userid) is currently active or inactive, noting that a user might be deemed inactive although the ITF and the IPTV terminal may still be powered on. The userid is specific to the user and is provided in addition to the device identity. As a result, the GW may store two or more activity statuses, for corresponding two or more userids, in relation with an identity of a same device. When the GW receives messages from the service provider network for that userid, it acts as a proxy by forwarding or discarding the messages to the user device, based on the device identity and on the activity status of the userid to which the message is intended.

In the context of the present invention, a gateway may comprise an IMS IPTV gateway. The invention may also apply in other types of networks besides IMS networks, for network services and applications other than IP television. As a result, the gateway of the present invention may comprise a gateway in other types of networks, a server, a router, and the like.

Figure 1:
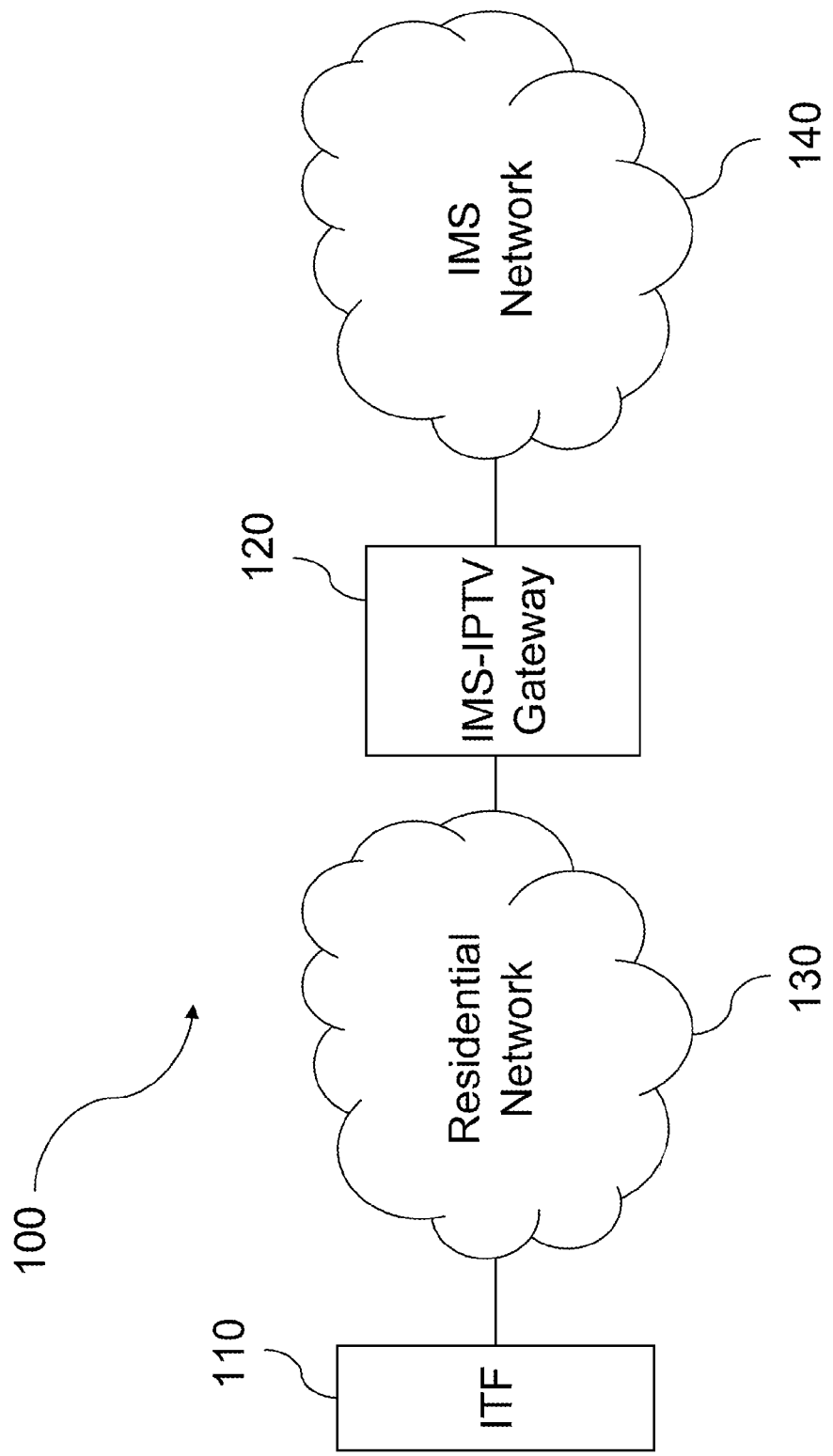
FIG. 1 represents a high level Internet Protocol television network architecture.

Reference is now made to the Drawings, in which FIG. 1 represents a high level Internet Protocol television network architecture. A network 100 comprises an IMS IPTV GW 120 and, as an end-user device, an ITF 110. The GW 120 is located in at a household entry. It connects the ITF 110 and a number of other IP-enabled household appliances (not shown) to external service providers (not shown) by providing access to an IMS network 140 and by supporting registration of the ITF 110 onto the IMS network 140. A residential network 130 is present between the GW 120 and the ITF 110, allowing the GW 120 to serve a plurality of devices within the household. While the exemplary network 100 of FIG. 1 is an IPTV network based on IMS, the present invention is not limited thereto. Other types of services besides IPTV and other network types besides IMS could advantageously benefit from the teachings of the present invention.

Figure 2:
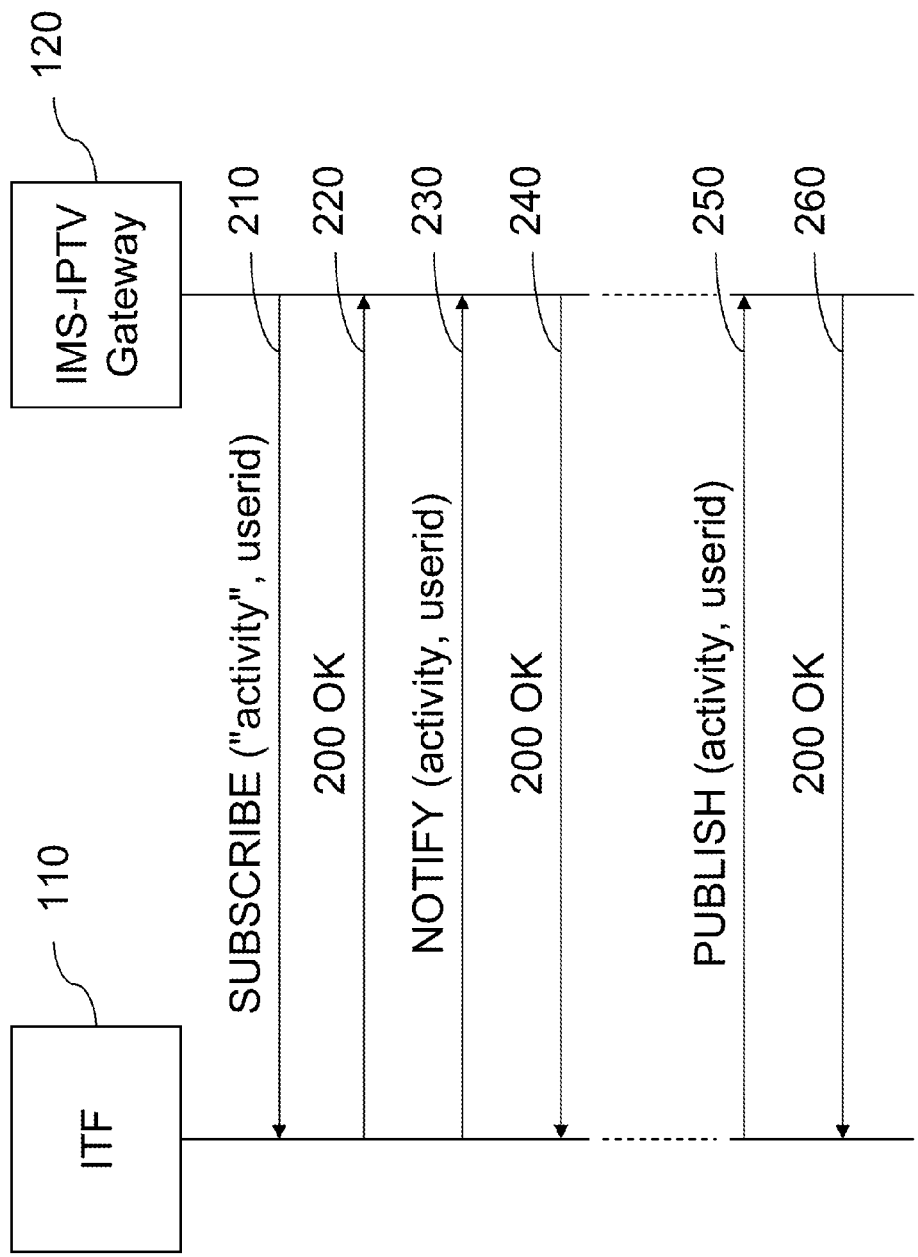
FIG. 2 shows a sequence diagram depicting exemplary preliminary steps of the method of the present invention.

FIG. 2 shows a sequence diagram depicting exemplary preliminary steps of the method of the present invention. Signaling takes place between the ITF 110 and the GW 120 of the network 100 introduced in the description of FIG. 1 and passes through the residential network 130. The sequence may comprise steps 210-240 or steps 250-260, as these represent two optional schemes of the present invention. The exemplary sequence of FIG. 2 shows an embodiment using session initiation protocol (SIP) signaling. Of course, other protocols than SIP could also be used.

At step 210, the GW 120 sends a SIP Subscribe message to the ITF 110. The SIP Subscribe message indicates that a parameter of interest to the GW 120 is the activity, or activity status, of a user designated by a userid comprised in the message. The SIP Subscribe message is addressed to the ITF 110 by use of the identity of the ITF 110. The address and the identity of the ITF 110 may have been discovered, and stored, by the GW 120, at the time the user registered with the GW 120, or thereafter by use of device discovery protocols. The ITF 110 acknowledges the request received in the SIP Subscribe message by replying with a SIP 200 OK message at step 220. At step 230, the activity status of the user changes by either going from active to inactive or from inactive to active. The ITF 110 sends a SIP Notify message towards the GW 120, the message comprising the ITF 110 identity as a source address and an updated activity state of the user identified by the accompanying userid. The GW 120 stores in a binding the activity status and the userid, along with the ITF 110 identity, and sends a 200 OK message at step 240 to acknowledge the SIP Notify message.

Alternatively, in some embodiments, the ITF 110 may be conceived so that it always informs the GW 120 of any activity status change of its users, without first having been requested to do so. The ITF 110 detects at step 250 that the user activity status changes, for example due to a user logging in through activation of some menu items interactively, and sends a SIP Publish message towards the GW 120, the SIP Publish message carrying the new activity status and the userid. As in the case of the SIP Notify message, the GW 120 stores the activity status and the userid, in a binding with the ITF 110 identity, and sends a 200 OK message at step 260 to acknowledge the SIP Publish message.

Figure 3:
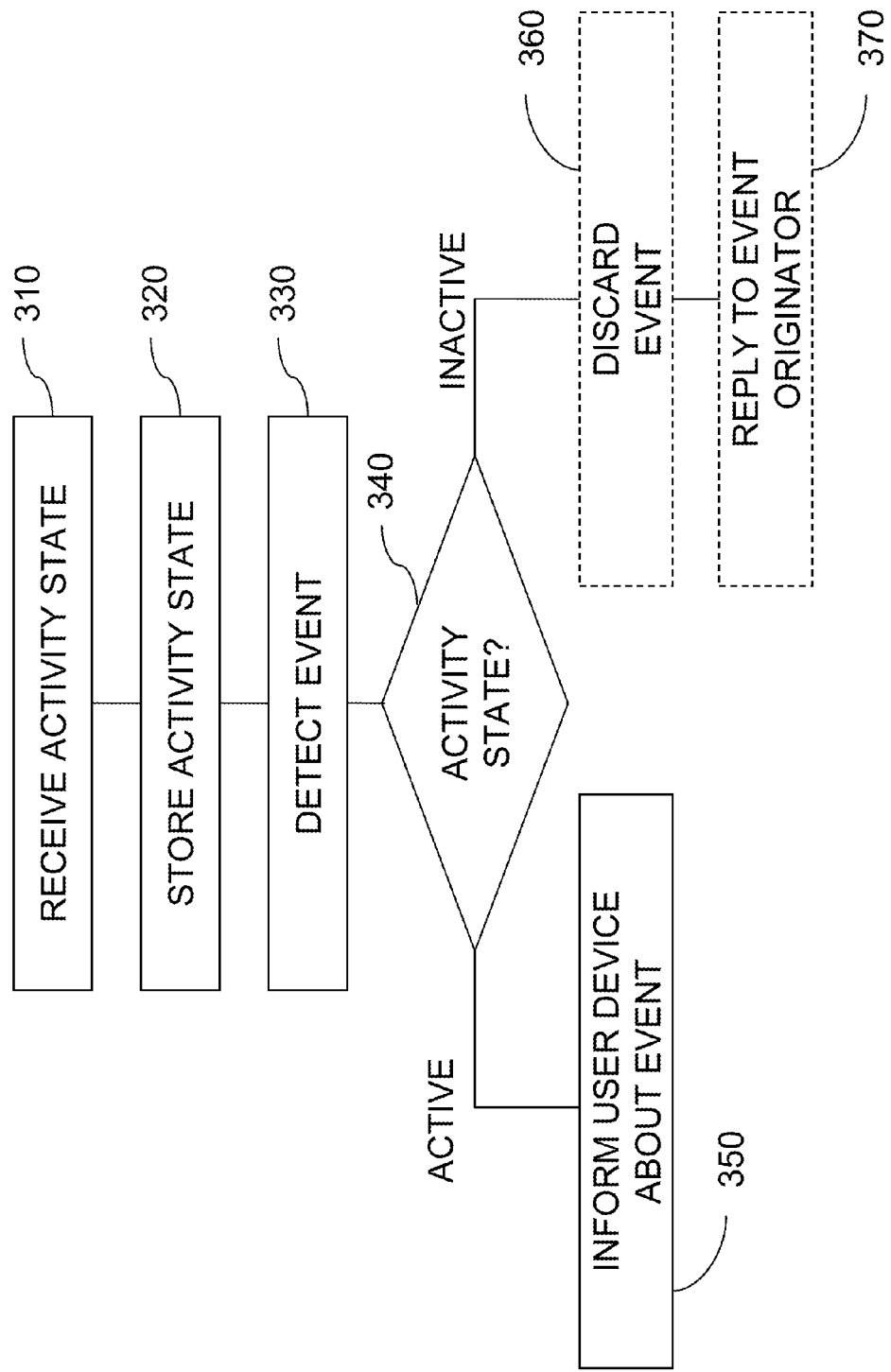
FIG. 3 shows an exemplary method for controlling delivery of event information to users according to some aspects of the present invention.

FIG. 3 shows an exemplary method for controlling delivery of network initiated event information to users according to some aspects of the present invention. The steps described in the foregoing description are embodied in the GW 120 of the preceding figures. The method starts at step 310 when the GW 120 receives information about the activity state of a user. The information comprises a device identity, the activity state itself and a userid. Step 310 may be exemplified by steps 230 or 250 of FIG. 2. At step 320, the GW 120 stores the activity state of the user along with the userid and the device identity. At step 330, the GW 120 detects an event of interest for a user. That event is related to a specific userid. The event may take the form of the receipt of a signal or message from a server (not shown) in the IMS network 140 destined for the userid. From the standpoint of the server in the IMS network 140, the GW 120 is the sole contact point for any message or signal addressed for the userid, as a binding between the userid and the GW 120 has been acquired by the IMS network 140 during the IMS registration process for the user. The binding of the device identity and of the userid in the GW 120 allows the GW 120 to properly route messages between the IMS network 140 and devices such as the ITF 110. Alternatively, in some embodiments, the event of interest may be generated internally within the GW 120. At step 340, the GW 120 verifies the activity state for the userid. If the activity state indicates "active", information is sent towards the user device about the event at step 350, using the device identity that is bound to the userid. Generally, the sent information comprises the userid, in order for the user device to properly direct the event information to the proper user. The sent information may also comprise other data, which is relevant for the service being used by the user. If at step 340, an inactive indication is found for the user, the GW 120 may simply discard the event at step 360. The GW 120 may optionally reply to the originator of the signal or message, if the even had been received from the IMS network 140. That option of generating a reply at the GW 120 may prevent that the server in the IMS network 140 resend the signal or message, thereby reducing potential congestion in the IMS network 140. For some services, the reply may constitute a positive acknowledgement to a request comprised in the signal or message. This may be the case, for example, when the user has preprogrammed recording of a movie and, while the user is inactive, tariff information is generated by the server and requires an acknowledgement.

In cases where a single user device is used by two or more users, each user having their own userid, steps 210-240 or 250-260 of FIG. 2 and steps 310-370 of FIG. 3 may be executed independently for each of the two or more users. The GW 120 stores in distinct bindings an activity state and a corresponding userid for each of the two or more users. Of course, each binding also comprises the identity of the relevant device. Therefore, in a case where a first user is inactive while a second user of the same device is active, when an event that is only of concern for the first user occurs, that event being related to the userid of the first user, the GW 120 verifies the userid and refrains from sending information about that event to the user device since only the second user is currently active. Considering an example where the user device is an IPTV STB. The first user has preprogrammed the recording of a first TV show. That first user is currently inactive because she is not currently watching the first TV show. At the same time, the second user is watching a movie. When the first TV show is about to terminate, the service provider sends a message, addressed to the first user, indicating "Your program has now ended". This message is not displayed on the TV monitor of the second user, who may be in the middle of his movie, because the event is filtered at the GW 120.

Distinct users of a same device are generally identified by distinct userids, which may be used at the GW 120 to distinguish between various users. In some alternative embodiments, rather than having more than one user of the same device, one single user may have more than one identity. This could be the case, for example, when one user has a first identity for business purposes and a second identity for personal purposes. The method and GW 120 of the present invention are capable of supporting both scenarios having multiple users of a same device or having multiple identities for a same device user.

A given user may be logged on two distinct devices, being active on a first device and inactive on a second one. In this case the GW 120 needs to store in a first binding a first activity state (active indication) for the userid in relation with an identity of the first device, and in a second binding a second activity state (inactive indication) for the same userid in relation with an identity of the second device. Upon detection of an event, the GW 120 delivers the event specifically to the first device, based on the knowledge that the user is active for the identity of the first device. Of course, the GW 120 may store any number of bindings for the same user if that user is logged on multiple devices.

Figure 4:
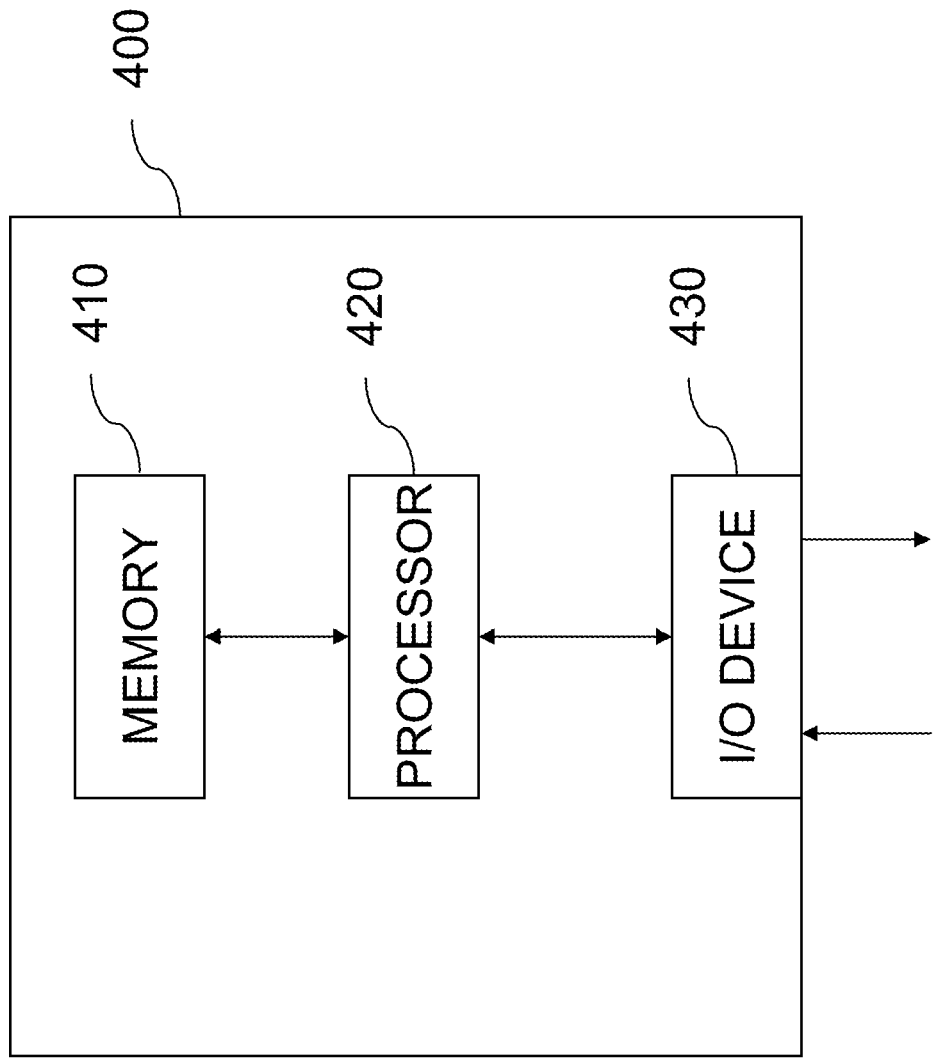
FIG. 4 shows an exemplary gateway according to an aspect of the present invention.

An exemplary construction of a gateway will now be described by reference to FIG. 4, which shows an exemplary gateway according to an aspect of the present invention. The gateway 400 comprises a memory 410, a processor 420 and an I/O device 430. The memory 410 may be a volatile memory, or may alternatively be a non-volatile memory, or persistent memory, that can be electrically erased and reprogrammed and that may be implemented, for example, as a flash memory or as a data storage module. The processor 420 may be any commercially available, general purpose processor, or may be specifically designed for operation in the gateway 400. The processor 420 may be operable to execute processes related to the present invention in addition to numerous other processes. The I/O device 430 may be implemented as one single device or as distinct devices for receiving (input) and sending (output) signaling, messages and data. The gateway 400 is connected towards a plurality of user devices and service providers, either directly or through residential networks and/or IMS networks; means for connecting the gateway 400 towards user devices and service providers may vary as, for example, connection towards one service provider might be on an Ethernet link while connection towards a user device might be on an asynchronous transfer mode (ATM) link. Therefore the I/O device 430 may comprise a plurality of devices for connecting on a plurality of links of different types. Only one generic I/O device 430 is illustrated for ease of presentation of the present invention. The gateway 400 may further act as a router and may thus comprise many more components, as is well-known in the art.

The gateway 400 controls delivery of event information to users. The memory 410 is capable of storing bindings of device identities, activity states and corresponding userids, for a plurality of users. The input-output device 430 receives a device identity, an activity state and a userid, and forwards these information elements to the processor 420. The processor 420 stores the device identity, the activity state and the userid in a binding within the memory 410. At some point in time later on, the processor detects an event related to a given userid. The processor 420 reads from the memory 410 the activity state for the given userid, and, if the activity state indicates that the user is active, the processor 420 also reads the corresponding device identity. Also if the activity state indicates active, the processor 420 requests the input-output device 430 to send, addressed to the device identity, the userid and information about the event. In the case where the activity state indicates that the user is inactive, one possible option for the processor 420 is to silently discard the event.

The input-output device 430 may receive a signal, for example from a service provider in the IMS network 140, and inform the processor 420 of that event. Analysis of the signal by the processor 420 may indicate that the signal comprises a userid and that the signal constitutes an event of interest of the userid. Depending on the activity state for the userid, the processor 420 may initiate sending information about that event to the user device or, if the user is inactive, the processor 420 may request the input-output device 430 to send a reply to the originator of the signal.

The memory 410 may store two or more activity states and two or more corresponding userids for a same user device. When the processor 420 detects an event, the processor 420 reads from the memory the activity state of one of the two or more users based on a userid associated with the event. The processor 420 determines whether to request the input-output device 430 to send information about the event based on the userid related to the event.

In some embodiments, as the processor 420 finds in the memory 410 a binding having the userid related to the event, if the activity state indicates inactive, the processor 420 may continue looking for the same userid in another binding. If found, the processor 420 verifies again in that other binding the activity state, in search for an active indication. As a result, the processor 420 may order the input-output device 430 to send information about the event towards any given device on which the user is currently active.

Several aspects of the preferred embodiment of the method, and of the gateway of the present invention have been illustrated in the accompanying Drawings and described in the foregoing Detailed Description. Notably, the present invention has been described in relation to a specific, exemplary type of service, the IPTV service. It will however be understood that the invention is not limited to the embodiment disclosed, but is capable of numerous rearrangements, modifications and substitutions without departing from the teachings of the invention as set forth and defined by the following claims.

The invention claimed is:

1. A method of controlling delivery of event information to users, the method comprising the steps of:
   receiving at a gateway, from a user device, a device identity, an activity state and a corresponding user identity;
   storing in the gateway a binding comprising the device identity, the activity state and the corresponding user identity;
   detecting at the gateway an event related to the user identity; and
   if the activity state indicates active, sending from the gateway, towards the user device, information about the event along with the corresponding user identity;
   wherein:
   the gateway stores two or more bindings for the user device, each of the two or more bindings comprising the device identity, a distinct activity state and a distinct user activity;
   a first one of the two or more bindings comprises an active indication;
   a second one of the two or more bindings comprises an inactive indication;
   the event is related to one of the distinct user identities comprised in one of the first and second bindings; and
   the gateway determines whether to send, towards the user device, information about the event based on the one of the distinct user identities related to the event.

2. The method of claim 1, wherein if the activity state indicates inactive, the gateway silently discards information about the event.

3. The method of claim 1, wherein the event comprises receiving a signal at the gateway; and
   the method further comprises, if the activity state indicates inactive, replying by the gateway to an originator of the signal.

4. The method of claim 1, further comprising the step of:
   sending from the gateway, towards the user device, a request for receiving updates about the activity state for the user identity.

5. The method of claim 4, wherein:
   the received activity state, the event, the information about the event and the request for receiving updates are comprised in session initiation protocol (SIP) messages.

6. The method of claim 1, wherein:
   the gateway stores a first and a second binding for two distinct devices and for a same user, each of the first and second bindings comprising the user identity, each of the first and second bindings comprising distinct activity states.

7. The method of claim 6, wherein:
   the step of sending from the gateway, towards the user device, information about the event if the activity state indicates active comprises sending the information to one of the two distinct devices if the activity state for that specific device indicates active.

8. The method of claim 1, wherein: the user device is an internet protocol television (IPTV) device.

9. A gateway for controlling delivery of event information to users, comprising:
   a memory for storing bindings of device identities with activity states and corresponding user identities;
   an input-output device for receiving a device identity, an activity state and a user identity, and for sending event information; and
   a processor for:
   receiving from the input-output device the device identity, the activity state and the user identity,
   storing in the memory a binding of the device identity, the activity state and the user identity,
   detecting an event related to the user identity,
   reading from the memory the activity state corresponding to the user identity, and
   if the activity state indicates active, requesting the input-output device to send, addressed to the device identity, the user identity and information about the event;
   wherein:
   the memory is further for storing bindings of two or more activity states and two or more corresponding user identities for a same user device;
   a first one of the two or more activity states contains an active indication for a first one of the corresponding user identities;
   a second one of the two or more activity states contains an inactive indication for a second one of the corresponding user identities;
   the event is related to one of the first and second user identities; and the processor is further for determining whether to request sending information about the event based on the user identity related to the event.

10. The gateway of claim 9, wherein:

the input-output device is further for receiving a signal; and the processor is further for detecting the event by analyzing the signal.

11. The gateway of claim 9, wherein:

the processor is further for silently discarding the event if the activity state indicates inactive.

12. The gateway of claim 9, wherein:

if the processor finds that the read activity state indicates inactive, the processor reads further in the memory in search for the same user identity in a distinct binding.

13. The gateway of claim 12, wherein:

if the processor finds the user identity in the distinct binding and if the distinct binding contains an active indication, the processor requests the input- output device to send the information about the event towards a device identity stored in the distinct binding.

\* \* \* \* \*